July 31, 1951 K. T. GRÖNDAHL 2,562,184
ELECTRODE STEAM GENERATOR
Filed July 16, 1946 2 Sheets-Sheet 1

INVENTOR.
Karl Theodor Gröndahl
BY
his ATTORNEY

July 31, 1951 K. T. GRÖNDAHL 2,562,184
ELECTRODE STEAM GENERATOR
Filed July 16, 1946 2 Sheets-Sheet 2

INVENTOR.
Karl Theodor Gröndahl
BY
his ATTORNEY

Patented July 31, 1951

2,562,184

UNITED STATES PATENT OFFICE 2,562,184

ELECTRODE STEAM GENERATOR

Karl Theodor Gröndahl, Goteborg, Sweden, assignor to Bohus Mekaniska Verkstads Aktiebolag, Goteborg, Sweden, a corporation of Sweden Application July 16, 1946, Serial No. 684,061
In Sweden July 28, 1945

30 Claims. (Cl. 219—40)

This invention relates to electrode steam generators, and more particularly to such generators having regulating means for maintaining at an approximately predetermined value either the amount of steam delivered per unit interval of time or the steam pressure and steam temperature, respectively.

One object of the present invention is to provide an electrode steam generator which, within certain limits, is independent of the voltage supplied to the electrodes and of the conductivity of the liquid supply.

The invention will be hereinafter more fully described with reference to the accompanying drawings showing by way of example several embodiments thereof.

Figure 1:
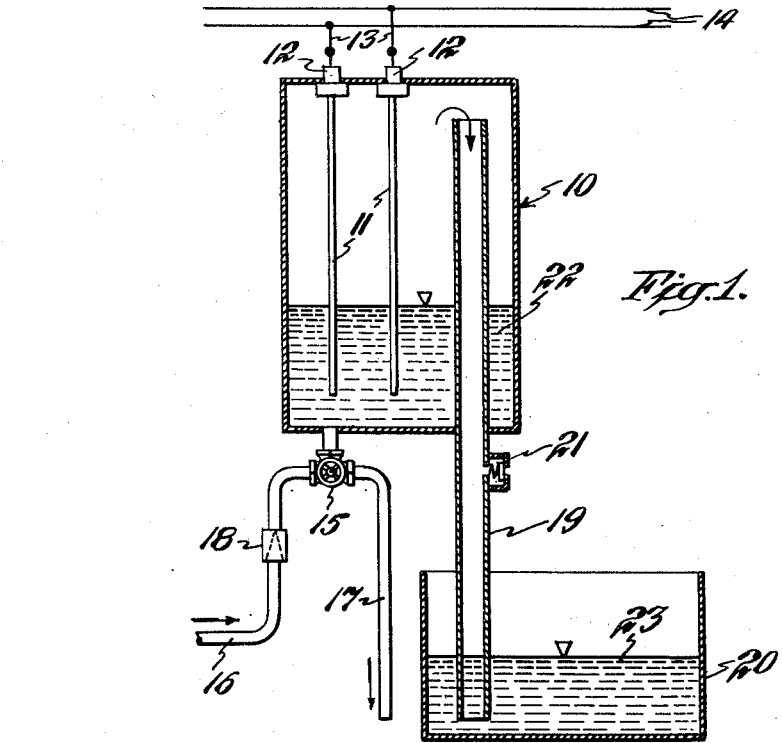
Fig. 1 shows diagrammatically in vertical section an electrode steam generator for an open system, adapted for blowing steam directly into a liquid receptacle.

In the construction illustrated in Fig. 1, the electrode steam generator comprises a receptacle 10 containing electrodes 11 which are connected to electrical conductors 13 and 14 through insulators 12 disposed on the cover of the receptacle, the conductors 14 being adapted to be connected to a suitable source of electrical energy. The area of the electrodes 11 is adapted to correspond to the desired output at the lowest prevailing voltage and for water with the highest electric resistance that occurs.

An inlet conduit 16 and an outlet conduit 17 are connected to the base of the receptacle by means of a three-way valve 15. In the inlet conduit, which is connected to the main water supply or a pumping equipment suitably connected to a hydrophore or other pressure compensating device, such as an open reservoir located at the necessary height, a throttle valve 18 is provided which, preferably when mounting the apparatus, is adjusted with respect to the available water pressure so as to allow the passage per unit interval of time of a volume of water corresponding to the output of the steam generator.

From the upper part of the receptacle 10 a steam outlet pipe 19 extends downwardly whose lower end opens freely in an open liquid receptacle 20 which may, for example, form part of a washing machine or other water consuming apparatus. A vacuum valve 21 may be arranged on the receptacle 10 or on the steam conduit 19, while the water content of the steam generator is designated by 22 and the water content of the receptacle 20 of the consuming apparatus intended to be heated by means of the steam discharged from the steam generator is denoted by 23.

The generator illustrated in Fig. 1 operates in the following manner. When the three-way valve 15 connected to the water inlet conduit 16 is opened after switching on the electric current to the electrodes 11 the water flows into the receptacle 10 and rises gradually in said receptacle, covering a larger and larger electrode area, until a balance is obtined when the quantity of steam formed per unit interval of time corresponds to the water quantity supplied during the same period. In order to cut off the water supply, the three-way valve is moved to a position closing the connection between the inlet conduit 16 and the receptacle 10, while the connection between the receptacle and the outlet conduit 17 is opened. In this way too great enrichment of conducting particles in the water taking place in the generator is prevented and a separate washing out rendered unnecessary.

In the event substantially the entire available area of the electrodes should become wetted when the electrodes 11 are connected to a source of electrical energy at a substantially definite voltage, water in the receptacle 10 would be vaporized at a maximum rate per unit interval of time. However, after the electrodes are connected to the source of electrical energy, water is supplied to the receptacle 10 at a substantially constant rate per unit interval of time which is less than the maximum rate just mentioned. In this manner a rise in liquid level takes place until an equilibrium condition is reached when the quantity of steam produced per unit interval of time corresponds to the quantity of water being supplied for such unit interval of time.

Hence, the liquid level in the receptacle 10 initially rises and wets an increasingly greater area of the electrodes and subsequently, when equilibrium conditions are attained, the liquid surface level automatically remains substantially constant and at the same height at all regions thereof in the receptacle. Under these conditions, the steam or vapor produced passes at a substantially constant pressure in its path of flow from the vessel 10 to the place of use.

When the water level in the receptacle 10 falls below the lower edge of the electrodes 11, the electric circuit between the latter is automatically opened. When the water supply is again opened, the amperage increases progressively until the above-mentioned balance is restored. Current peaks necessitating electric conductors of excessive size will not therefore occur. The generator delivers per unit interval of time a constant quantity of steam which is adapted for heating water in open receptacles, for example, in washing machines and the like.

Figure 2:
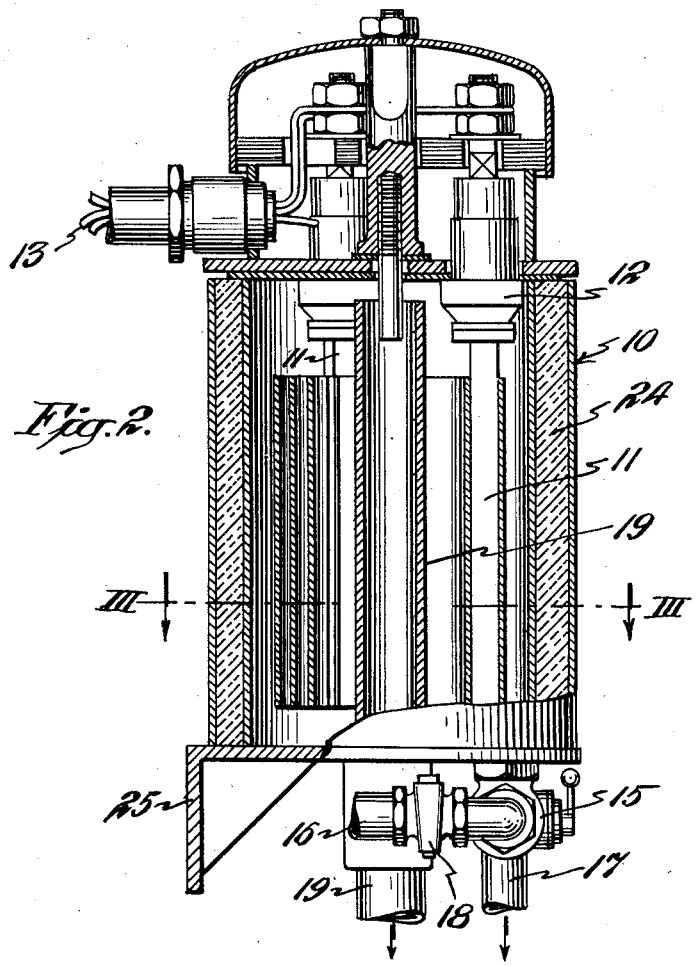
Fig. 2 shows a practical construction of such a steam generator partly in section on the line II—II of Fig. 3.
Figure 3:
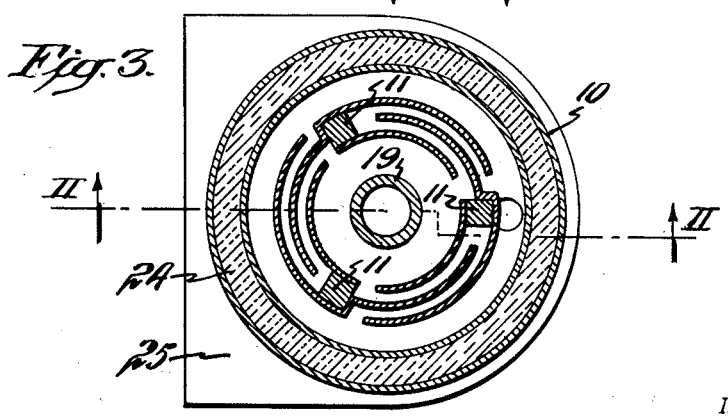
Fig. 3 is a section on the line III—III of Fig. 2.

The generator shown in Figs. 2 and 3 is intended for 3-phase alternating current operation and includes three electrodes 11. The electrode members of plate form consist of corrosion-proof material, such as stainless steel, which are perforated (not shown), and the liquid receptacle is surrounded externally by a heat insulating layer 24 of glass wool or the like. The generator is supported on a bracket 25 which may be mounted directly on the consuming apparatus or, for example, on a wall adjacent the latter. Corresponding elements are designated by the same reference numerals in Figs. 2 and 3 as in Fig. 1.

Figure 4:
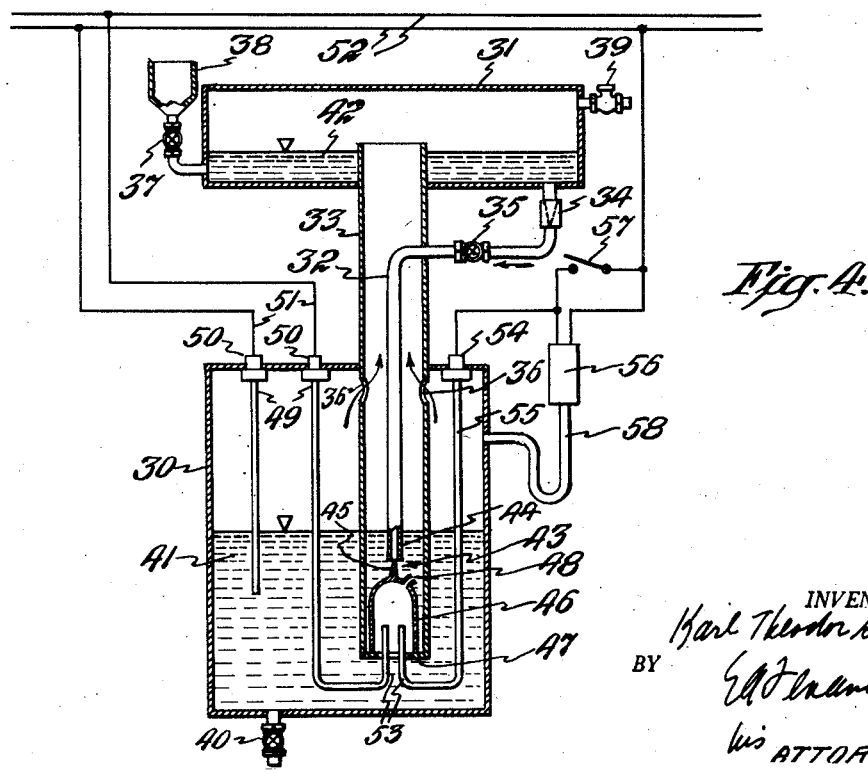
Fig. 4 shows diagrammatically in vertical section an electrode steam generator for a closed system.

In the embodiment shown in Fig. 4, the steam generator comprises a closed receptacle 30 communicating through a water conduit 32 and a steam conduit 33 with another closed receptacle 31, which may consist of or be disposed in a table of a pressing or ironing machine (hot mangle) or may be associated with any other type of heat consuming apparatus. The steam conduit 33 terminates somewhat above the base of the receptacle 31, so as to provide a collecting space for water between the end of the conduit and the base of the receptacle. A throttle valve 34 and a manually operable cut-off valve 35 are connected in the water conduit 32. The water conduit is disposed within the steam conduit and terminates somewhat above the base of the receptacle 30. The steam conduit 33 extends down below the lower end of conduit 32, and in the vicinity of the cover of the receptacle 30 it is provided with apertures 36, through which steam formed may pass from the receptacle 30, in order to escape into the receptacle 31 of the heat consuming apparatus through the conduit 33. Receptacle 31 is connected to a refilling funnel 38 through a valve 37 and is provided with a safety valve 39. A drain valve 40 is disposed at the base of the receptacle 30. The water content of the generator is designated by 41 and the water content of the receptacle 31 of the heat consuming apparatus by 42.

In the water conduit 32 is disposed an automatically acting valve, designated generally by 43, which comprises a nozzle or seat 44 arranged at the lower end of the water conduit 32. This nozzle may be closed by means of a conical valve 45 disposed on the upper face of a dome-like receptacle 46 which is open at its lower end and disposed in the lower part of the steam outlet pipe 33 of the generator. In its lower position, the dome 46 rests against an inwardly projecting flange 47 provided at the steam outlet pipe. In order to facilitate the vertical motion of the dome, hereinafter described, it is provided at its upper part with a small aperture 48.

In the embodiment shown, two electrodes ("main electrodes") 49 for generating the desired amount of steam are disposed in the receptacle 30, the electrodes being connected to electrical conductors 51 and 52 through insulators 50 mounted on the cover of the receptacle, the conductors being adapted to be connected to a suitable source of electrical energy. Two additional electrodes ("auxiliary electrodes") 53 project into the dome 46, one of which is connected to one of the main electrodes by means of a conductor and the other connected to the source of electrical energy by means of a conductor 55 passing through an insulator 54 and through an automatic switch 56 and a manually operable switch 57, the two auxiliary electrodes 53 thus being of opposite polarity. The automatic switch 56 may be actuated by a pressostat or thermostat which is connected to the steam space of the generator or of the receptacle 31 by means of piping 58.

The steam generator illustrated in Fig. 4 operates in the following manner. The receptacle 31 of the consuming apparatus is filled with a suitable quantity of water which may pass downwardly into the generator 30 through the throttle valve 34 after the electrodes 49 are connected to the source of electrical energy. When the water level in the receptacle 30 has reached the electrodes and gradually rises, steam is generated in the same manner as in the generator illustrated in Fig. 1. If the steam consumption in the consuming apparatus varies, the water supply to the steam generator is automatically regulated by means of the regulating valve 43 operated responsive to the automatic switch 56. When the steam pressure has reached the value for which the pressostat or thermostat of the switch 56 is adjusted, this switch is closed to complete the circuit of the auxiliary electrodes 53. Steam is thus generated about the electrodes 53 and the dome 46 becomes filled with steam so that, due to the upwardly directed pressure, the dome rises and reduces and shuts off the water supply through the seat 44.

When the pressure falls, the switch 56 automatically opens the circuit for the auxiliary electrodes 53 and the steam generation in the dome 46 ceases. The enclosed amount of steam escapes through the aperture 48 in the upper portion of the dome and the dome becomes filled with water, so that the upward pressure ceases and the dome falls downwardly toward the flange 47, simultaneously opening the regulating valve 43. The manually operable switch 57 provides means to short-circuit the automatically actuated switch 56 and to close the electrical circuit, so that the generator may be re-adjusted for merely maintaining the water heated during interruption in the work.

When it is desired to drain off the water from the receptacle 30 through the valve 40 but not simultaneously to empty the receptacle 31 of water, the manually operable valve 35 may be periodically closed. When the work is ended for the day, the valve 35 is also closed, so that the generator will be automatically emptied of water. This prevents flow of current of relatively high magnitude when the generator is again started in operation.

In the embodiment of Fig. 4, steam or vapor flows through conduit 33 to a closed space formed by the vessel 31, and the supply of water to vessel 30 is controlled by valve 43 which is operable responsive to the regulating device 56 which is influenced by temperature or pressure of the vapor in the steam generating system.

In both Figs. 1 and 4 it will be understood that steam would be produced at a maximum rate per unit interval of time providing the entire available area of the electrodes became wetted by the liquid body in which the electrodes are disposed. However, the throttle valve 18 in Fig. 1 and throttle valve 34 in Fig. 4, which are unaffected by operating conditions within the respective steam generating systems, serve as regulators to supply a quantity of water per unit interval of time which is less than the maximum rate just mentioned so as to maintain the liquid surface level of the liquid bodies in receptacle 10 and vessel 30 at a region between the upper and lower ends of the electrodes when vapor is being generated.

Hence, the throttle valves 18 and 34 desirably are adjusted, having regard to the electrical conductivity of the water and the water pressure to which such throttle valves are subjected, to supply water to the receptacle 10 and vessel 30 at a rate which comes within the range referred to above. In both Figs. 1 and 4 the receptacle 10 and vessel 30 are formed to provide a single compartment for holding the body of liquid which is subjected to passage of heating current therethrough, whereby a vapor space overlies the liquid surface level of each liquid body in which all regions of the liquid surface level will be subjected substantialy to the same vapor pressure.

In the embodiment of Fig. 1 steam produced in vessel 10 flows through conduit 19 which extends downwardly through a vertical height to the liquid surface level of the liquid body 23, the steam being discharged into intimate contact with such liquid below its liquid surface level. As shown, the vessel 10 is located higher than the liquid surface level in vessel 20. When the production of steam in the vessel 10 stops and a sub-atmospheric pressure develops within the steam generating system, the valve 21 becomes operable to establish atmospheric pressure in the system.

Although the invention has been described above in connection with several illustrative embodiments thereof, it is obvious that the details thereof may be varied in many respects. For example, in a modification of the embodiment shown in Fig. 4, the valve 43 may be disposed outside the steam generator in a separate chamber connected to the liquid space of the generator.

I claim:

1. In a method of generating vapor with the aid of a generator providing a space having spaced apart electrodes therein adapted to be connected to a source of electrical energy for passing a heating current through a body of liquid to produce vapor, such liquid body having a liquid surface level in the vapor generating space, the improvement which comprises first connecting the electrodes to the source of electrical energy, and thereafter supplying liquid to said space so as to initially cause the liquid surface level therein to rise and wet an increasingly greater area of the electrodes and subsequently cause the liquid surface level to automatically remain substantially constant and at the same height at all regions thereof by supplying the same quantity of liquid to the space per unit interval of time as that at which liquid is vaporized and expelled from the liquid body.

2. In a method of generating vapor with the aid of a generator providing a space having spaced apart electrodes therein adapted to be connected to a source of electrical energy at a substantially definite voltage for passing a heating current through a body of liquid which, in the event substantially the entire available area of the electrodes becomes wetted, would vaporize liquid at a maximum rate per unit interval of time, the improvement which comprises first connecting the electrodes to such source of electrical energy, and thereafter supplying liquid to the space at a substantially constant rate per unit interval of time which is less than said maximum rate so as to initially cause the liquid surface level therein to rise and wet an increasingly greater area of the electrodes and subsequently cause the liquid surface level to remain substantially constant and substantially at the same height at all regions thereof by supplying liquid to the space at substantially the same rate per unit interval of time as that at which liquid is vaporized and expelled in vapor phase from the liquid body.

3. In a method of generating steam from water, having an electrical conductivity which may vary between upper and lower limits, with the aid of a generator providing a space having spaced apart electrodes adapted to be connected to a source of electrical supply at a substantially definite voltage for passing a heating current through a body of such water which, in the event substantially the entire available area of the electrodes becomes wetted and the water is at the lower limit of its conductivity, would vaporize the water at a maximum rate per unit interval of time, the improvement which comprises first connecting the electrodes to such source of electrical energy, and thereafter supplying the water to the space at a substantially constant rate per unit interval of time which is less than said maximum rate so as to initially cause the liquid surface level to rise therein and wet an increasingly greater area of the electrodes and subsequently cause the liquid surface level to remain substantially constant and substantially at the same height at all regions thereof by supplying water to the space at substantially the same rate per unit interval of time as that at which water is vaporized and expelled in vapor phase from the liquid body.

4. The method set forth in claim 3 which further includes the step of automatically flowing water from said generator space when the supply of water thereto is stopped.

5. In a method of generating vapor with the aid of a generator providing a space having spaced apart electrodes therein adapted to be connected to a source of electrical energy for passing a heating current through a body of liquid to produce vapor, such liquid body having a liquid surface level in the vapor generating space, the improvement which comprises first connecting the electrodes to the source of electrical energy, thereafter supplying liquid to said space so as to initially cause the liquid surface level to rise therein and wet an increasingly greater area of the electrodes and subsequently cause the liquid surface level to automatically remain substantially constant and substantially at the same height at all regions thereof by supplying the same quantity of liquid to the space per unit interval of time as that at which liquid is vaporized and expelled from the liquid body, and flowing vapor at a substantially constant pressure in a path of flow from said space to a place of use.

6. In a method of generating vapor with the aid of a generator system providing a first closed space having spaced apart electrodes therein adapted to be connected to a source of electrical energy for passing a heating current through a body of liquid to produce vapor, such liquid body having a liquid surface level in the vapor generating space, the improvement which comprises first connecting the electrodes to the source of electrical energy, and thereafter supplying liquid to said first space so as to initially cause the liquid surface level to rise therein and wet an increasingly greater area of the electrodes and subsequently cause the liquid surface level to automatically remain substantially constant and substantially at the same height at all regions thereof by supplying the same quantity of liquid to the first space per unit interval of time as that at which liquid is vaporized and expelled in vapor phase from the liquid body, flowing vapor in a path of flow from said first space to another closed space, and controlling the supply of liquid to said first space responsive to a condition influenced by the vapor temperature or pressure in the system.

7. A vapor generating system comprising a generator including a vessel having spaced apart electrodes therein adapted to be connected to a source of electrical energy for passing a heating current through a body of liquid to produce vapor, said generator being capable of vaporizing liquid at a maximum rate per unit interval of time when said electrodes are connected to a source of electrical energy at a substantially definite voltage and substantially the entire available area of the electrodes becomes wetted by the liquid body, a supply conduit adapted to be connected to a source of liquid supply for conducting liquid to said vessel, conduit means for conducting vapor from said vessel to a place of use, and regulating means associated with said supply conduit to render the latter operable, when said electrodes are connected to said source of electrical energy, to supply a quantity of liquid per unit interval of time to said vessel which is less than the aforesaid maximum rate at which liquid is capable of being vaporized in the same unit interval of time so as to maintain the liquid surface level of the liquid body at a region between the upper and lower ends of said electrodes when vapor is being generated, said regulating means being unaffected by operating conditions within the system, and said vessel being constructed and formed to provide a single compartment for holding the body of liquid having a vapor space above the liquid surface level of the liquid body in which all regions of such liquid surface level will be subjected substantially to the same vapor pressure.

8. A stream generating system comprising a generator including a closed vessel having spaced apart primary electrodes therein adapted to be connected to a source of electrical energy for passing a heating current through a body of water to produce steam, said generator being capable of vaporizing water, depending upon its electrical conductivity, at a maximum rate per unit interval of time when said electrodes are connected to a source of electrical energy at a substantially definite voltage and substantially the entire available area of the electrodes becomes wetted by the body of water, a supply conduit adapted to be connected to a source of supply of water under pressure for conducting water to said vessel, conduit means for conducting steam from said vessel to a place of use, and throttling means connected in said supply conduit which is unaffected by operating conditions within the system, said throttling means being so arranged and adjusted in said supply line that, having regard to the electrical conductivity of the water and the pressure under which the water is maintained at the source of supply, said supply conduit is rendered operable, when the electrodes are connected to said electrical source of energy, to supply a quantity of water per unit interval of time to said vessel which is less than the aforesaid maximum rate at which water is capable of being vaporized in the same unit interval of time so as to maintain the liquid surface level of the liquid body at a region between the upper and lower ends of said electrodes when vapor is being generated, and said vessel being constructed and formed to provide a single compartment for holding the body of liquid having a vapor space above the liquid surface level of the liquid body in which all regions of such liquid surface level will be subjected substantially to the same vapor pressure.

9. A vapor generating system comprising a generator including a first vessel having spaced apart electrodes therein adapted to be connected to a source of electrical energy for passing a heating current through a body of liquid to produce vapor, said generator being capable of vaporizing liquid at a maximum rate per unit interval of time when said electrodes are connected to a source of electrical energy at a substantially definite voltage and substantially the entire available area of the electrodes becomes wetted by the liquid body, a supply conduit adapted to be connected to a source of liquid supply for conducting liquid to said first vessel, means associated with said supply conduit to render the latter operable, when the electrodes are connected to said source of electrical energy, to supply a quantity of liquid per unit interval of time to said first vessel which is less than the aforesaid maximum rate at which liquid is capable of being vaporized in the same unit interval of time, another vessel adapted to hold a second body of liquid, conduit means for conducting vapor from said first vessel through a vertical height extending downwardly to the liquid surface of the second liquid body and discharging such vapor into intimate contact with said second liquid body below its liquid surface level, and means associated with said conduit means for establishing atmospheric pressure in the system responsive to sub-atmospheric pressure therein due to cessation of vapor production in said generator.

10. A vapor generating system as set forth in claim 9 in which said first vessel is located higher than the liquid surface level of the second liquid body adapted to be held in said other vessel.

11. A vapor generating system as set forth in claim 7 in which said conduit means for conducting vapor to a place of use extends downwardly through the bottom of the vessel, the upper end of such conduit means being in communication with the vapor space in said vessel.

12. A vapor generating system as set forth in claim 7 including a device establishing communication between the interior of said vessel and the atmosphere responsive to reduction in pressure therein.

13. A vapor generating system as set forth in claim 7 including valve means connected in the liquid supply conduit in addition to said regulating means which is operable to shut off and permit flow of liquid to said vessel and allow liquid to drain therefrom by gravity flow when the flow of liquid to said vessel is shut off.

14. A vapor generating system as set forth in claim 7 including a three-way valve connected in said liquid supply conduit in addition to said regulating means which is operable to permit liquid to flow by gravity from said vessel when actuated to shut off flow of liquid to said vessel.

15. A vapor generating system as set forth in claim 7 including valve means connected in said liquid supply line in addition to said regulating means which is operable to reduce the supply of liquid to said vessel responsive to a condition influenced by vapor temperature or pressure in the system.

16. A vapor generating system as set forth in claim 7 including valve means in addition to said regulating means which is connected in said liquid supply conduit for shutting off flow of liquid to said vessel responsive to predetermined rise in pressure therein.

17. Apparatus as set forth in claim 8 in which said conduit means for conducting steam from said generator vessel communicates with the vapor space of another closed vessel serving as the place of use, said other vessel being connected in said water supply conduit in which, in addition to said throttling means, is connected a manually operable valve for controlling the supply of water to said generator vessel.

18. Apparatus as set forth in claim 17 including valve means in addition to said throttling means which is associated with said supply conduit for controlling the supply of water to said generator vessel responsive to the rate at which vapor is consumed at the place of use.

19. Apparatus as set forth in claim 8 in which said conduit means for conducting vapor from said generator vessel communicates with the vapor space of another closed vessel serving at the place of use, said other vessel being connected in said water supply conduit in which, in addition to said throttling means, is connected a manually operable valve for controlling the supply of water to said generator vessel, and additional valve means associated with said supply conduit for controlling the supply of water to said generator responsive to a condition influenced by the steam temperature in the system.

20. Apparatus as set forth in claim 8 in which said water supply conduit extends vertically downward into said generator vessel, valve means cooperating with the lower end of said supply conduit, a vertically movable vessel whose lower end is open and to which said valve means is connected, and means including a pair of spaced apart auxiliary electrodes adapted to be connected to the source of electrical energy which are disposed in said generator vessel so as to generate vapor which will collect in said movable vessel to cause the latter to move upwardly and actuate said valve means to its closed position at the lower end of said supply conduit.

21. Apparatus as set forth in claim 20 including an electrical circuit for energizing said auxilliary electrodes responsive to an operating condition influenced by the steam temperature in the system.

22. Apparatus as set forth in claim 8 in which said water supply conduit extends vertically downward into said generator vessel, valve means cooperating with the lower end of said supply conduit, a vertically movable vessel whose lower end is open and to which said valve means is connected, and means including a pair of spaced apart auxiliary electrodes adapted to be connected to the source of electrical energy which are disposed in said generator vessel so as to generate vapor which will collect in said movable vessel to cause the latter to move upwardly and actuate said valve means to its closed position at the lower end of said supply conduit, said auxiliary electrodes being at a lower level in said vessel than said primary electrodes.

23. Apparatus as set forth in claim 22 including an electrical circuit for energizing said auxiliary electrodes responsive to a predetermined increase in an operating condition influenced by the steam temperature in the system.

24. A vapor generating system comprising a generator including a first vessel having spaced apart electrodes adapted to be connected to a source of electrical energy for passing a heating current through a body of liquid to produce vapor, means for supplying liquid to said first vessel, another vessel adapted to hold a second body of liquid, means including a connection for conducting vapor from said first vessel to said other vessel and discharging such vapor into intimate contact with the second liquid body below the liquid surface level thereof, and means for establishing communication within the system and the atmosphere responsive to sub-atmospheric pressure in the system due to cessation of vapor production in said generator.

25. A vapor generating system comprising a generator including a first vessel having spaced apart electrodes adapted to be connected to a source of electrical energy for passing a heating current through a body of liquid to produce vapor, means for supplying liquid to said first vessel, another vessel adapted to hold a second body of liquid, conduit means for conducting vapor from said first vessel through a vertical height extending downwardly below the liquid surface level of the second liquid body, the lower end of said conduit means communicating with said other vessel to discharge vapor into intimate contact with the second liquid body below its liquid surface level, and means associated with said conduit means for establishing atmospheric pressure in the system responsive to sub-atmospheric pressure therein due to cessation of vapor production in said generator.

26. A vapor generating system comprising a generator including a first vessel having spaced apart electrodes adapted to be connected to a source of electrical energy for passing a heating current through a body of liquid to produce vapor for heating purposes, means providing a place for holding a quantity of such liquid, conduit means for conducting liquid from said other place to said first vessel, and structure associated with said last-mentioned conduit means including a throttling valve member, a manually operable valve member, and valve means operable during operation of the system for intermittently shutting off the supply of liquid to said first vessel.

27. A vapor generating system comprising a generator including a first vessel having spaced apart electrodes adapted to be connected to a source of electrical energy for passing a heating current through a body of water to produce steam for heating purposes, conduit means adapted to be connected to a source of water supply under pressure for supplying water to said first vessel, and structure connected in said conduit means including another vessel adapted to hold a body of water, throttling means unaffected by operating conditions within the system, manually operable valve means, and valve means operable responsive to the rate at which steam is consumed for heating purposes for controlling the supply of water to said first vessel.

28. A vapor generating system as set forth in claim 27 in which said last-mentioned valve means for controlling the supply of water to said first vessel is operable responsive to a condition influenced by the steam temperature in the system.

29. A vapor generating system as set forth in claim 27 in which said last-mentioned valve means includes a hollow member adapted to be submerged in water and effective, upon upward movement thereof, to close said valve means to shut off the supply of water to said first vessel.

30. A vapor generating system as set forth in claim 27 in which said other vessel is closed and serves as a place of use for heating purposes, conduit means connecting said first vessel and other vessel which always provides unobstructed communication therebetween for flow of steam from the former to the latter, and said other vessel being closed and having valve means operable upon a predetermined increase in steam pressure for discharging steam to the atmosphere.

KARL THEODOR GRÖNDAHL.

REFERENCES CITED

The following references are of record in the file of this patent:

UNITED STATES PATENTS

| Number | Name | Date |
| --- | --- | --- |
| 1,504,928 | Bergeon | Aug. 12, 1924 |
| 1,665,793 | Sandborgh | Apr. 10, 1928 |
| 1,862,071 | Vickery | June 7, 1932 |
| 1,941,020 | Poindexter | Dec. 26, 1933 |
| 2,006,631 | Eaton | July 2, 1935 |
| 2,180,445 | Vickery | Nov. 21, 1939 |
| 2,185,786 | Eaton | Jan. 2, 1940 |
| 2,215,604 | Cronkhite et al. | Sept. 24, 1940 |
| 2,308,784 | Silvers | Jan. 19, 1943 |
| 2,355,687 | Van Hise | Aug. 15, 1944 |

Certificate of Correction

Patent No. 2,562,184 — July 31, 1951

KARL THEODOR GRÖNDAHL

It is hereby certified that error appears in the printed specification of the above numbered patent requiring correction as follows:

Column 2, line 19, for "obtined" read *obtained*; column 7, line 54, for "stream" read *steam*; column 9, line 35, for "at the" read *as the*; lines 60 and 61, for "auxilliary" read *auxiliary*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*